United States Patent
Burd et al.

(10) Patent No.: US 8,786,979 B1
(45) Date of Patent: *Jul. 22, 2014

(54) SELF SERVO WRITE PROCESS FOR DISCRETE TRACK MEDIA

(71) Applicant: Marvell International Ltd., Hamilton (BM)

(72) Inventors: Gregory Burd, San Jose, CA (US); Qiyue Zou, San Jose, CA (US); Xueshi Yang, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/020,717

(22) Filed: Sep. 6, 2013

Related U.S. Application Data

(63) Continuation of application No. 12/951,923, filed on Nov. 22, 2010, now Pat. No. 8,531,792.

(60) Provisional application No. 61/264,186, filed on Nov. 24, 2009.

(51) Int. Cl.
*G11B 5/09* (2006.01)
*G11B 21/02* (2006.01)

(52) U.S. Cl.
USPC .............................................. 360/75; 360/51

(58) Field of Classification Search
None
See application file for complete search history.

(56) References Cited

U.S. PATENT DOCUMENTS

| 7,952,825 | B2 | 5/2011 | Chu et al. |
|---|---|---|---|
| 8,031,428 | B1 | 10/2011 | Rutherford |
| 8,477,444 | B1 | 7/2013 | Zou et al. |
| 8,654,470 | B1 | 2/2014 | Zou et al. |
| 2008/0239906 | A1 | 10/2008 | Akagi et al. |
| 2008/0304173 | A1 | 12/2008 | Albrecht et al. |
| 2009/0168228 | A1 | 7/2009 | Sado et al. |
| 2010/0118426 | A1 | 5/2010 | Vikramaditya et al. |
| 2010/0128384 | A1 | 5/2010 | Shibano |

*Primary Examiner* — Regina N Holder

(57) ABSTRACT

Systems and techniques relating to control of magnetic devices are disclosed. A described technique includes receiving a waveform via a head about a recording medium which includes data tracks and servo regions, detecting a servo region based on the waveform becoming an alternating signal, which is indicative of the head's path over discrete radially arranged magnetic strips in the servo region; performing a frequency synchronization of a read clock based on the detection to establish a frequency lock; performing a phase synchronization of the read clock to align a phase of the read clock with respect to acquired samples of the alternating signal; performing a synchronization of a write clock based on a write of a test sequence to the medium, the write clock being responsive to the frequency lock and the read clock; and writing, using the synchronized write clock, data to the medium for servo control.

20 Claims, 12 Drawing Sheets

SELF SERVO WRITE PROCESS FOR DISCRETE TRACK MEDIA

CROSS REFERENCE TO RELATED APPLICATION

This disclosure is a continuation of and claims the benefit of the priority of U.S. patent application Ser. No. 12/951,923, filed Nov. 22, 2010, and entitled "Self Servo Write Process for Discrete Track Media", which claims the benefit of the priority of U.S. Provisional Application Ser. No. 61/264,186, filed Nov. 24, 2009 and entitled "A Self Servo Write Process for Discrete Track Media." The disclosures of the above applications ar incorporated herein by reference in their entirety.

BACKGROUND

Storage devices, such as a magnetic medium based disk drive, can store data on circular, concentric tracks on a disk surface. A drive head, such as a read-write head, retrieves and records data on a magnetic layer of a rotating disk as the head flies on a cushion of air over the disk surface. When retrieving data, magnetic field variations are converted into an analog electrical signal, the analog signal is amplified, converted to a digital signal, and interpreted. To guarantee the quality of the information saved on and read back from the disk, the read-write head should be accurately positioned at the center of the track during both writing and reading, and the speed or frequency of read and write should be accurately controlled with respect to the rotating disk. A closed-loop control system can respond to servo information embedded in dedicated portions of a track on the recording surface to accurately position the head and synchronize the timing of drive operations such as read and write operations.

The servo information defines the position of the data tracks and is written with great accuracy in order for a closed-loop control system to operate properly. Typically, servo information is written on a disk surface as a radially extending set of spokes or wedges, e.g., servo wedges. In some implementations, a portion of a servo wedge at a particular track location can include a synchronization field, index mark, and a track number. Head positioning relative to a track center can be determined and corrected, if necessary, by reading and noting the respective amplitudes and timings of the offset bursts.

Traditionally, a machine called a servo writer is used to write the servo information on the disk surface. Commonly, a servo writer uses a large, massive granite base to minimize the effects of vibration. The servo writer can also use precision fixtures to hold the target drive, a precision, laser-interferometer-based actuator arm positioning mechanism to place the arms radially with respect to the axis of rotation of the disks in the drive, and an external clock head to position the servo wedges in time. Present servo writers are typically large and expensive, and as the typical track density increases, the servo writing time also increases, which can create a bottleneck in the disk drive manufacturing process at the servo writer station.

To reduce the time required by the servo writer, techniques such as self-servo writing (SSW) have been developed. Instead of using a dedicated servo writer to slowly write the servo information to each concentric data track on each surface of each disk in a hard drive, a SSW process enables a disk drive itself to write servo patterns to the disk surface based on position marks that are pre-written to the disk surface when the drive is assembled. The position marks are used for the disk drive to locate the positions to write servo pattern, and the marks are written to the disk by a machine which is simpler and cheaper than a dedicated servo writer. Without the aid of the servo writer, a disk drive itself can use information derived from the position marks to determine the radial and circumferential position of the head in order to write conventional servo information to the disk surface.

SUMMARY

The present disclosure includes systems and techniques for operating a recording device, such as a disk drive. A recording device can contain a medium that includes data tracks disposed on discrete strips of magnetic material that are arranged based on circumferences of the medium. The medium can include servo regions disposed on discrete strips of magnetic material that are arranged based on radii of the medium and extend from an inner diameter of the medium to an outer diameter of the medium.

According to an aspect of the described systems and techniques, a method for operating a disk drive includes receiving data indicative of a waveform produced by a head operated with respect to a recording medium, detecting, when the medium is in a state of uniform magnetic polarity, a beginning of a servo region of the servo regions based on the waveform changing from a non-alternating signal to an alternating signal, the non-alternating signal being indicative of the head's path over a data track of the data tracks, and the alternating signal being indicative of the head's path over discrete magnetic strips in the servo region, performing a synchronization of one or more clocks based on the detected beginning of the servo region, and writing, based on the synchronization, data to the servo region for servo control of the medium.

These and other implementations can include one or more of the following features. Performing the synchronization can include synchronizing a phase and a frequency of a read clock with the medium. Performing the synchronization can include synchronizing a phase and a frequency of a write clock with the medium. The phase of the write clock can be synchronized with the phase of the read clock. Writing data to the servo region can include using the write clock to write preamble and servo data to the servo region. Implementations can include performing an erase on the medium to put the medium in the state of uniform magnetic polarity. Performing the synchronization can include using a detected beginning of a first servo region and a detected beginning of a second servo region to determine a measured clock count, determining a difference based on the measured clock count and a target clock count, and adjusting a clock frequency of a read clock based on the difference. Performing the synchronization can include performing a zero-phase start to align a phase of the read clock with respect to acquired samples of the alternating signal. Performing the synchronization can include writing, based on a write clock, a test sequence with a known periodic pattern to the data track, determining a phase difference of the write clock based on a read back of the test sequence, and adjusting a phase of the write clock based on the phase difference.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, one or more disclosed embodiment can be implemented in various systems and apparatus, including, but not limited to, a special purpose data processing apparatus (e.g., a wireless communication device such as a wireless access point, a remote environment monitor, a router, a switch, a computer system component, a medium access unit), a mobile data processing apparatus (e.g., a wireless client, a cellular telephone, a personal digital assistant (PDA), a mobile computer, a digital camera), a general purpose data processing apparatus such as a computer, or combinations of these.

Systems and apparatuses can include an interface to receive data indicative of a waveform produced by a head operated with respect to a recording medium and processor electronics configured to perform operations. The medium can include data tracks disposed on discrete strips of magnetic material that are arranged based on circumferences of the medium and servo regions disposed on discrete strips of magnetic material that are arranged based on radii of the medium and extend from an inner diameter of the medium to an outer diameter of the medium. The operations can include receiving data indicative of the waveform via the interface, detecting, when the medium is in a state of uniform magnetic polarity, a beginning of a servo region of the servo regions based on the waveform changing from a non-alternating signal to an alternating signal, the non-alternating signal being indicative of the head's path over a data track of the data tracks, and the alternating signal being indicative of the head's path over discrete magnetic strips in the servo region, performing a synchronization of one or more clocks based on the detected beginning of the servo region, and writing, based on the synchronization, data to the servo region for servo control of the medium.

Details of one or more implementations are set forth in the accompanying drawings and the description below. Other features and advantages may be apparent from the description and drawings, and from the claims.

DRAWING DESCRIPTIONS

Like reference symbols in the various drawings indicate like elements.

DETAILED DESCRIPTION

Figure 1:
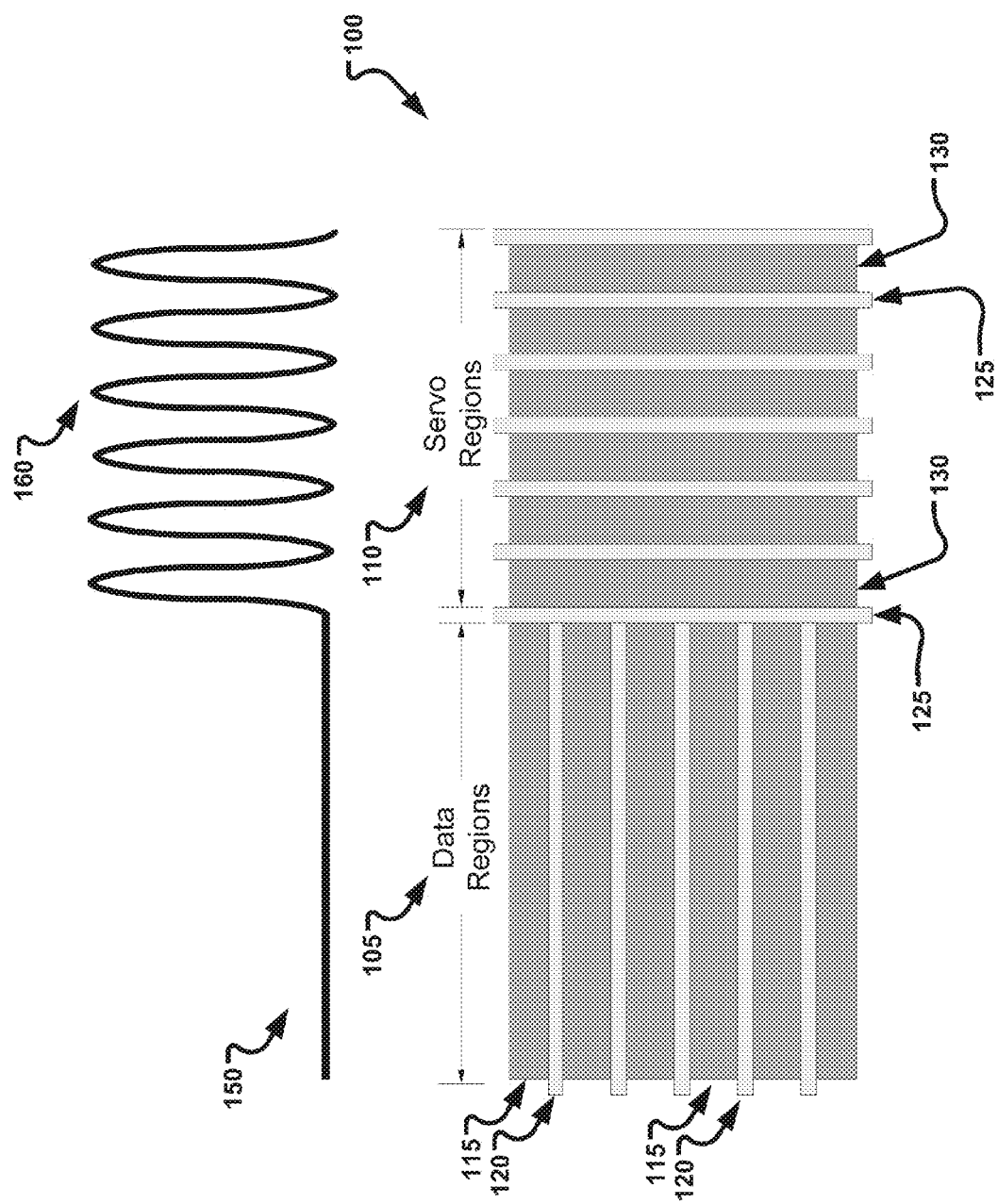
FIG. 1 shows an example of a layout of a portion of a discrete track medium and associated read signal waveforms for a uniform polarization state.

Disk drives that include Discrete Track Media (DTM), rather than continuous media, can offer several advantages such as increased data storage, better head-repositioning tolerance, and reduced adjacent track interferences. As increasing areal density with continuous media may cause increasing implementation complexities, DTM can extend magnetic recording technology beyond current continuous media and serve as a bridge towards bit-patterned media (BPM). A DTM based disk can include different types of regions such as data regions and servo regions. These regions include discrete magnetic areas and discrete non-magnetic areas. A disk drive can leverage a layout of these regions to perform a SSW.

A DTM based disk can include one or more recording layers having multiple regions that are patterned into land and groove sections. In some implementations, disk tracks are separated physically and magnetically by grooves. For example, the shape and width of the tracks are defined precisely by discretely formed structures on the surface of the disk. Further, the layout orientation of a data region can differ from that of a servo region. During rotation of a DTM based disk, signals produced by a read head's passage over the disk surface can be used to detect when the read head passes between different regions of a track on the disk.

Disk drives with DTM can require precise head positioning for track seeking. Drive controllers for DTM based drives can use one or more properties of DTM technology, e.g., characteristics of a layout of magnetic and non-magnetic areas, to perform a SSW process to write servo information on one or more DTM based disks. Various examples of such characteristics can include one or more of information regarding disk geometry (e.g., disk diameter), positioning of regions, the number of tracks, the number of servo regions, the number of data regions, and the number of discretely formed magnetic areas in a region. The servo information stored by the servo regions can provide a disk drive with head position information to enable an actuator to position and maintain a head in proper alignment with a track centerline when data are written to or read from one or more data regions.

In some implementations, a DTM based disk includes a pre-printed pattern that defines magnetic and non-magnetic areas of regions such as servo regions and data regions. In some implementations, the controller can use information regarding the pre-printed pattern on the disk to find servo locations and synchronize the frequency and phase for the read and write clocks before writing servo data to the disk.

A DTM based SSW process can include performing an erase such as a direct current (DC) erase, detecting a preamble region, synchronizing the phase and frequency of the read and write clocks, and writing of desired preamble and servo data to the servo region. In some implementations, the hard drive performs the SSW process independently of any external device. The hard drive can be configured to start the SSW process based on an initial power-up after the hard drive's assembly. In some implementations, an external device commands the hard drive to start a SSW process. In some implementations, processor instructions for a SSW process are included in hard drive firmware.

A drive controller can implement a method to synchronize a phase of a write clock for writing in a servo region of a DTM based disk. The controller can synchronize a read clock phase with the disk medium through a Zero-Phase Start (ZPS) process. The controller can synchronize the write clock phase with the read clock phase through one or more test write and read back cycles. In some implementations, the write clock phase is iteratively synchronized with the medium via multiple test write and read back cycles such that servo data can be written to the servo region.

A drive controller can implement a method to detect and find one or more servo regions on a blank discrete track media disk. The controller can perform a DC erase of the disk to cause the disk to be in a uniform polarization state. The controller can rotate the disk and process a read signal from a read head positioned over a track of the disk. After the DC erase, the portion of a read signal associated with a servo region can exhibit a sinusoidal pattern and the portion of the read signal associated with a data region exhibits a DC signal. In some implementations, the controller detects a transition from the DC signal to the sinusoidal signal.

FIG. 1 shows an example of a layout of a portion of a discrete track medium and associated read signal waveforms for a uniform polarization state. A discrete track medium 100 includes data regions 105 and servo regions 110 (additional data regions and servo regions, although present, are not shown). The data regions 105 are disposed on discrete strips of magnetic material 115 that are arranged on circumferences of the medium 100. Neighboring strips of magnetic material 115 of the data regions 105 are separated by strips of non-magnetic material 120. The servo regions 110 are disposed on discrete strips of magnetic material 130 that are arranged on radii of the medium 100 and extend from an inner diameter of the medium 100 to an outer diameter of the medium 100. Neighboring strips of magnetic material 130 of the servo regions 110 are separated by strips of non-magnetic material 125. Multiple servo regions 110 can be arranged with respect to one or more data tracks to define separate portions of the data tracks, e.g., a data track includes multiple data regions situated on the same track that are separated by servo regions. For example, when a head is operated to follow a track for a full revolution, the head will pass over, alternatingly, data regions 105 of the track and servo regions 110 of the track.

A drive controller can perform an erasure to cause the medium 100 to have a uniform magnetic polarity, that is to say, the magnetic portions of the medium 100 have a uniform magnetic polarity. In some implementations, a manufacturing process for the medium 100 includes a bulk erasure of the medium 100. Based on the medium 100 having a uniform magnetic polarity, a read head that is operated to follow a track produces a non-alternating signal 150 (e.g., a DC signal) for a data region 105 and an alternating signal 160 (e.g., a sinusoidal signal) for a servo region 110. In greater detail, when the head passes over the data region 105 of a track, the head observes a continuous magnetic field which causes a non-alternating signal 150. When the head passes over the servo region, while still following on the same track, the head alternately observes discrete magnetic fields and the lack thereof due to the interleaved strips of non-magnetic materials 125.

Figure 2:
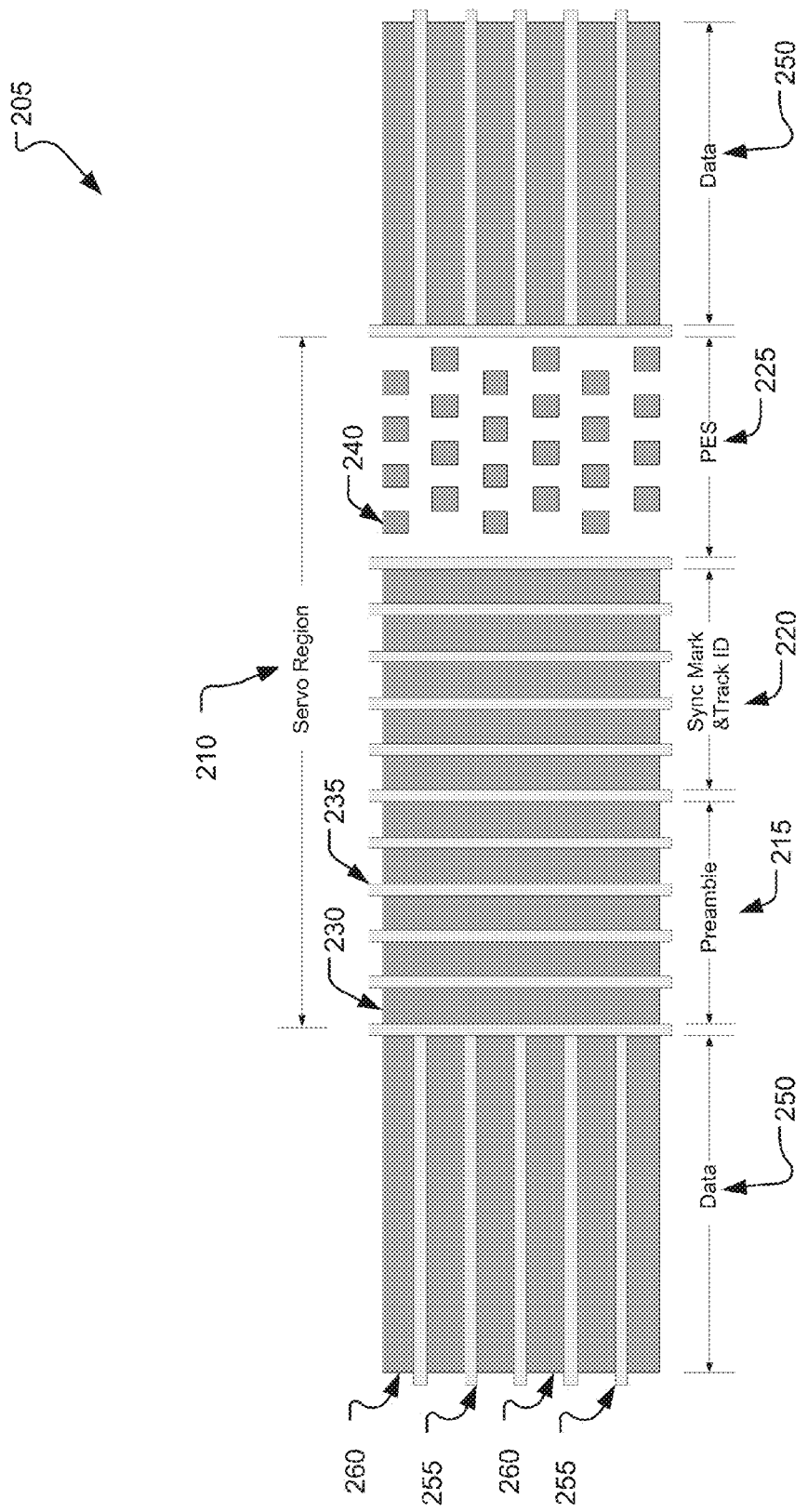
FIG. 2 shows another example of a layout of a discrete track medium.

FIG. 2 shows another example of a layout of a discrete track medium. A DTM disk 205 includes data regions 250 and servo regions 210. The data regions 250 are separated physically and magnetically by groove strips 255. The servo regions 210 separate different portions of the data regions 250. A track can include two or more magnetic strips 260, in two or more respective data regions 250, which are arranged on the same circumference of the DTM disk 205.

In this example, a DTM disk 205 has a patterned format for a servo region 210. The servo region 210 includes a preamble region 215, a sync mark and track ID region 220, and a positioning error signal (PES) region 225. In some implementations, the preamble region 215 and the sync mark and track ID region 220 are formed by magnetic strips 230, that run radially from an inner diameter to an outer diameter, e.g., along disk radii, which are along an off-track direction. The magnetic strips 230 in the servo region 210 are separated by groove strips 235. In some implementations, a servo region 210 can include hundreds of magnetic strips 230 separated by groove strips 235. In some implementations, in the PES region 225, pre-printed patterns are formed by magnetic islands 240 and grooves.

In preparing a hard disk drive for read and write functions, servo information such as sync mark data and track identifiers can be written on one or more servo region of a DTM based disk. In some manufacturing techniques, servo information is written onto one or more servo sectors of each disk by using a servo writer during a drive assembly process. Such techniques can be very costly. SSW techniques can reduce manufacturing costs by using the read and write heads in a drive to write the servo regions of one or more disks inside the drive after assembly.

SSW techniques can require the precise writing of servo data at prescribed positions on a disk. In some implementations of DTM based disks, a servo region is defined by pre-printed magnetic and groove strips. SSW techniques for DTM can require increased precision to write data to pre-defined locations on a DTM based disk, e.g., magnetic lands between the grooves.

A SSW technique for a continuous media disk can include writing a spiral pattern on a blank continuous media disk. The spiral pattern serves as a reference for the drive to search for the correct position to write servo information. Since a continuous media disk is fully blank before servo information is written, such a spiral pattern, or similar pattern, is required for performing SSW. For DTM, servo regions can include strips of magnetic and non-magnetic material arranged in one or more pre-printed patterns. A DTM disk drive controller can use information about these pre-printed patterns in a SSW process, among other things.

In some implementations, a controller can write information such as preamble, sync mark, and a track identifier to a servo region of a blank DTM disk. In some implementations, a controller can determine the position of a servo region by using a pattern transition from a data region to a servo region, e.g., a preamble zone situated on a starting portion of a servo region. In some implementations, a controller can align a phase of a write clock such that servo data can be actually written to the magnetic lands between grooves.

Figure 3:
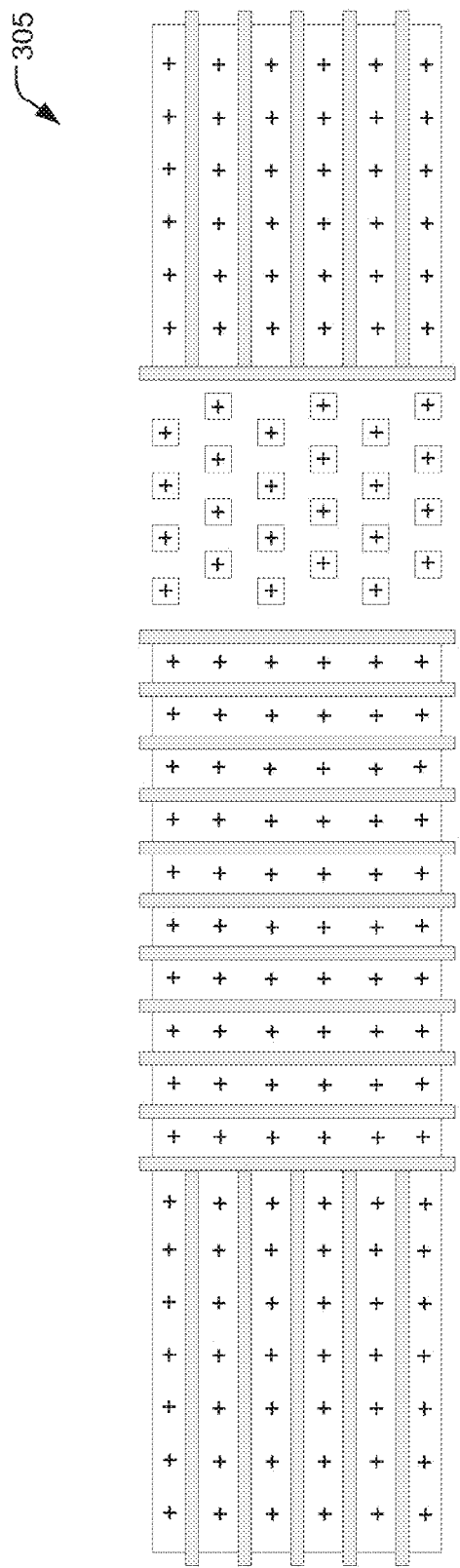
FIG. 3 shows an example of a uniform magnetic polarity state of a discrete track medium.

FIG. 3 shows an example of a uniform magnetic polarity state of a discrete track medium. A discrete track medium 305 is placed in a uniform magnetic polarity state. In some implementations, a DC erase process produces this state. For example, the polarities of the magnetic fields caused by the magnetic material included in the medium 305 are pointing in the same direction. In this figure, one such direction is denoted by a "+" sign, however, the opposite direction is also possible and would have been denoted by a "−" sign.

Figure 4:
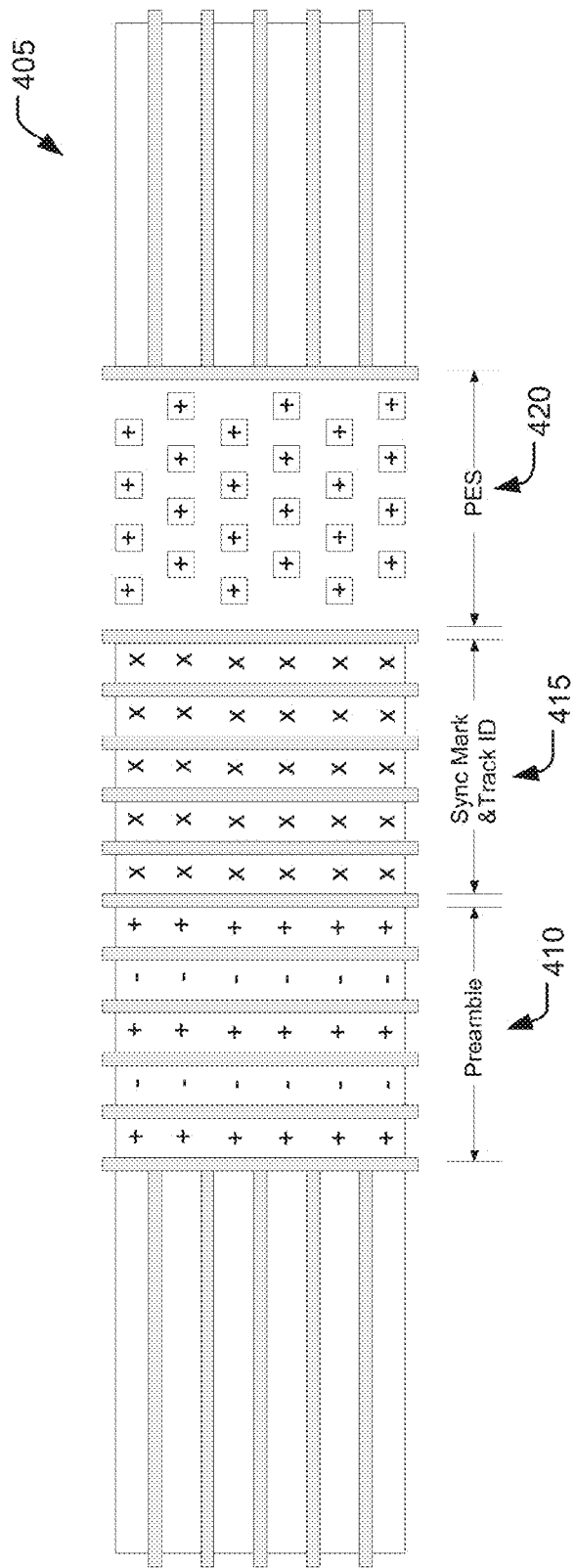
FIG. 4 shows an example of the polarity states of a discrete track medium after a self-servo write process.

FIG. 4 shows an example of the polarity states of a discrete track medium after a self-servo write process. A disk controller can control a rotation of a discrete track medium 405. The controller can write an alternating pattern of magnetic polarities (e.g., depicted by "+" and "−") to a preamble region 410 of the medium 405. The controller can write, as required, to a sync mark & track ID region 415. In FIG. 4, "X" denotes a magnetic polarity, which can be "+" or "−", that is dependent on the specific data written to the sync mark & track ID region 415. The controller can cause or maintain a uniform polarity state in a PES region 420.

Figure 5:
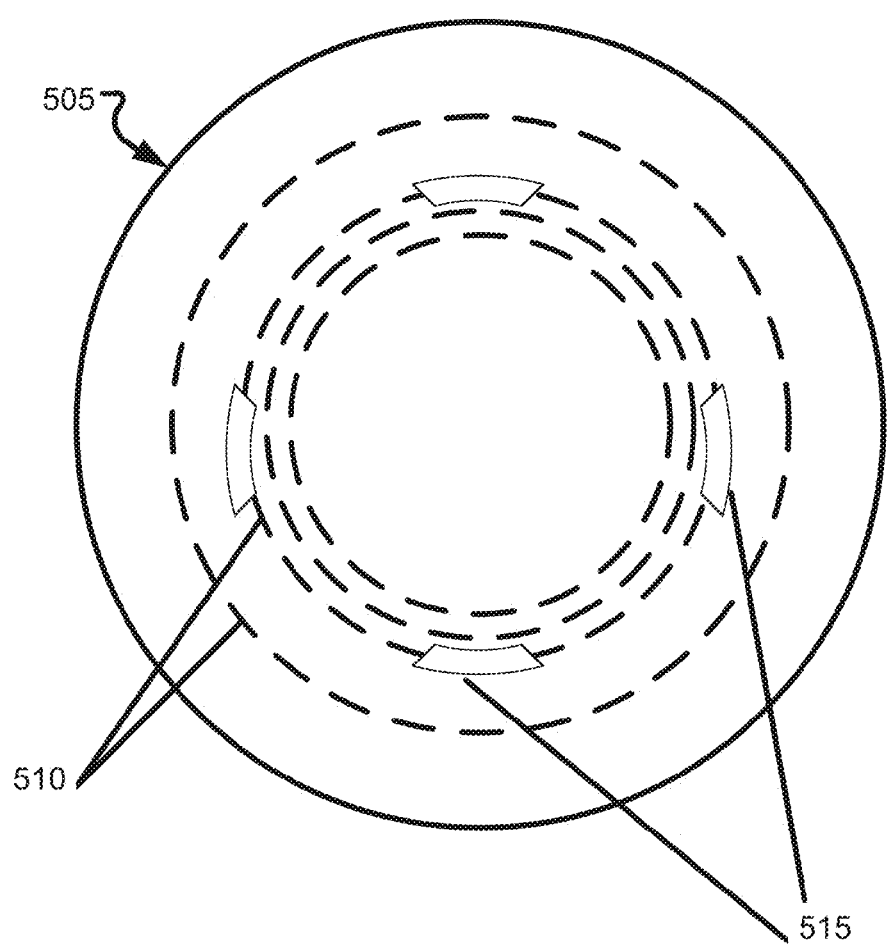
FIG. 5 shows an example of a surface of a recording medium that includes servo wedges.

FIG. 5 shows an example of a surface of a recording medium that includes servo wedges. A recording medium 505, such as a DTM, includes multiple data tracks 510. The data tracks 510 are concentrically located areas defining tracks associated with different radii on a surface of the recording medium 505. Data tracks 510 are encoded with data representing position information in servo regions, e.g., servo wedges 515. In some implementations, a servo wedge 515 includes information such as a servo wedge index and a track number. A disk control system can use the servo wedges 515 to control a rotation of the recording medium 505. In some implementations, data tracks 510 are divided into multiple data sectors and formatted in radial zones. A data region can include one or more data sectors associated with one or more data tracks 510.

Radial zones radiating outwardly from the inner diameter (ID) to the outer diameter (OD) of the recording medium 505 can be written at progressively increased data frequencies to take advantage of an increase in linear velocity of the medium surface in the respective radial zones. Data tracks 510 can be interspersed or segregated by servo data written within the servo wedges 515 (e.g., that extend radially from the ID to the OD).

For sake of brevity and simplicity, FIG. 5 only shows four servo wedges 515 on one data track 510. However, a recording medium 505 can include significantly more servo wedges 515 (e.g., hundreds of servo wedges) on multiple data tracks 510.

The servo wedges 515 can be equally spaced about the circumference of the platter surface. Each servo wedge 515 can include servo patterns written thereon. For example, each servo wedge 515 can include data and supporting bit patterns that can be used for control and synchronization of a drive head over a desired storage location on a recording medium 505.

Servo patterns contained in each servo wedge 515 can be read by the drive head as the surface of the recording medium 505 passes under a drive head. Servo patterns written in the servo wedges 515 can provide a disk control system with head position control information to control an actuator arm when moving a drive head from starting tracks to destination tracks during random access track seeking operations. The servo patterns can provide a disk control system with head position control information to control an actuator arm when positioning and maintaining a drive head in proper alignment with a track during track following operations when data are read from or written to data sectors on the data tracks 510.

In some implementations, before performing a read or write operation on a portion of a data track 510, a drive head can lock onto a desired track by referring to the positioning information retrieved using the servo patterns in a given servo wedge 515. By writing the servo wedges 515 onto the recording medium 505, the servo wedges 515 can provide the positioning information necessary to control a spindle motor rotating the recording medium 505 and to position a drive head to read and write data at the correct locations on the recording medium 505.

A servo wedge 515 can include a preamble, a sync mark (e.g., used for locking a phase and frequency of a servo timing loop clock to the disk(s)), location information such as a track identification field and data block address (e.g., used for identifying a target track and data block), and burst fields (e.g., used for providing servo fine location information). In some implementations, a servo wedge 515 can include one or more of a preamble, location information such as Servo Index Mark (SIM), Servo Address Mark (SAM), SIM/SAM (SSM), Gray Code (GC), and a Position Error Signal (PES).

Figure 6:
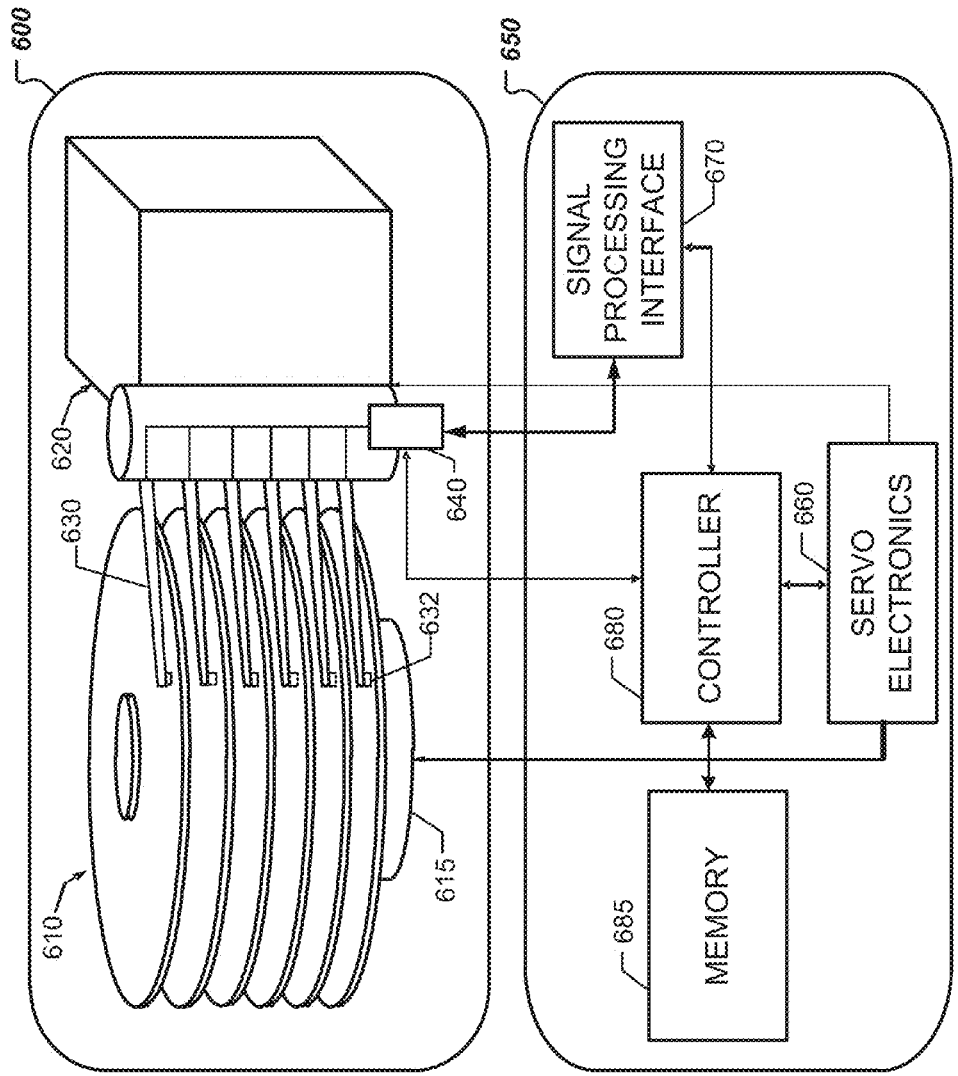
FIG. 6 shows an example of a disk drive system.

FIG. 6 shows an example of a disk drive system. The disk drive includes a head-disk assembly (HDA) 600 and drive electronics 650 (e.g., a printed circuit board assembly (PCBA) with semiconductor devices). The disk drive can include a magnetic recording medium such as one or more DTM based disks 610. A disk 610 can be coated with a magnetically hard material (e.g., a particulate surface or a thin-film surface) and can be written to, or read from, a single side or both sides of each disk. In some implementations, a disk 610 is coated with magnetic material in a predefined pattern to create data tracks and servo regions. In some implementations, a disk 610 can be manufactured to have a configuration such as the one depicted by FIG. 2.

The HDA 600 includes one or more disks 610 mounted on an integrated spindle and motor assembly 615. The integrated spindle and motor assembly 615 includes a spindle motor to rotate the disks 610. The spindle and motor assembly 615 rotates the disk(s) 610 under one or more drive heads such as read-write head(s) 632 mechanically coupled with a head assembly 620 in the HDA 600. A read-write head 632 can include a transducer, (e.g., a medium read element and a medium write element) or an integrated read/write element. In some implementations, a read-write head 632 includes a read head and a write head.

A read-write head 632 on an arm 630 can be positioned as needed to read or write data on the disk. A motor, such as a voice coil motor (VCM), can be used to position the read-write head 632 over a target track on a disk 610. The arm 630 can be a pivoting or sliding arm and can be spring-loaded to maintain a proper flying height for the read-write head 632 in any drive orientation. The HDA 600 can include a preamp/writer 640, where head selection and sense current value(s) can be set. The preamp/writer 640 can amplify a read signal before outputting it to signal processing interface 670. Signals between the HDA 600 and drive electronics 650 can be carried through a flexible printed cable.

Drive electronics 650 can include servo electronics 660, signal processing interface 670, and controller 680. The signal processing interface 670 can include a read signal circuit, a servo signal processing circuit, and a write signal circuit. Controller 680 can include processor electronics such as one or more processors to operate the disk drive. The controller 680 can be configured to perform one or more techniques described herein. A controller 680 can communicate with a memory 685 such as a non-volatile memory to retrieve firmware to operate processor electronics. The memory 685 can store data such as synchronization parameters estimated by a technique described herein. In some implementations, controller 680 includes a storage area for computer program code and data.

The controller 680 can be communicatively coupled with an external processor or data bus to receive read/write instructions, receive data to write to disk(s) 610, and transmit data read from one or more disks 610. Controller 680 can direct servo electronics 660 to control mechanical operations, such as head positioning through the head assembly 620 and rotational speed control through the motor assembly 615. In some implementations, the controller 680 can be integrated with the servo electronics 660 and/or signal processing interface 670 and can be implemented as one or more integrated circuits (ICs). Drive electronics 650 can also include one or more interfaces, such as a host-bus interface, and memory devices, such as a read only memory (ROM) for use by a microprocessor, and a random access memory (RAM) for use by a hard disk drive controller.

Disk(s) 610 are written with servo information such as servo regions, e.g., servo wedges, to aid the controller 680 in adjusting the position of the read-write head 632 with respect to a track on the disk(s) 610 and to control the spindle and motor assembly 615. Servo wedge information read by a drive head can be converted from analog signals to digital data by a digital-analog converter, and fed into servo electronics 660. The servo positional information can be used to detect the location of the drive head in relation to a target track or target data sector on a disk 610. Servo electronics 660 can use, for example, target data sectors and servo position information to precisely place a read-write head 632 over the target track and data sector on a disk 610, and to continuously maintain head alignment with the target track while writing or reading data to or from one or more identified data sectors.

Figure 7:
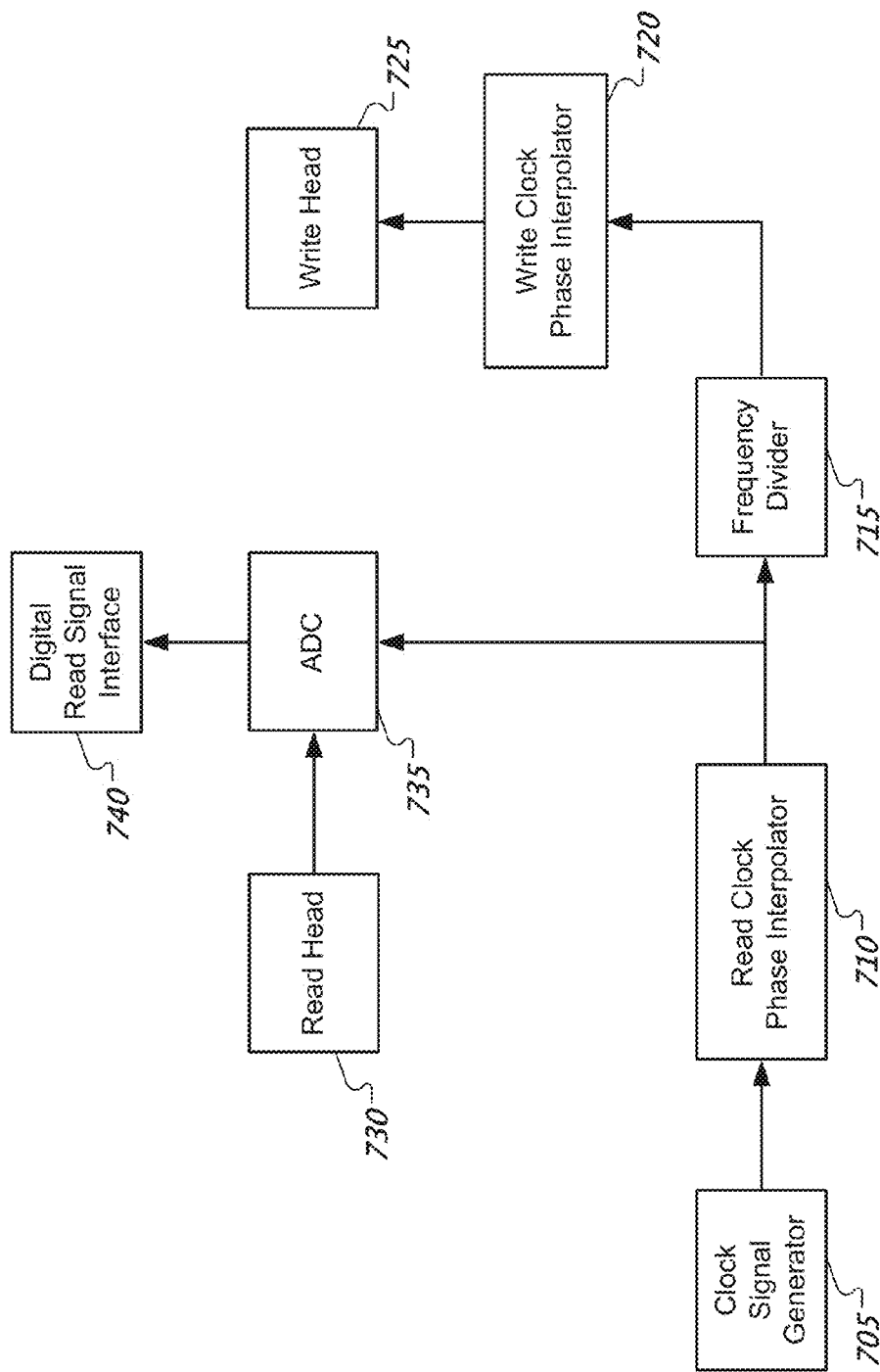
FIG. 7 shows an example of a clock architecture for a disk drive system.

FIG. 7 shows an example of a clock architecture for a disk drive system. A disk drive system can include circuitry to produce one or more clock signals for various operations such as acquiring data from a disk or writing data to a disk. A clock architecture uses a clock signal generator 705, read clock phase interpolator 710, a frequency divider 715, and a write clock phase interpolator 720. The write head 725 and the read head 730 can use the same clock source, e.g., clock signal generator 705. A drive system includes an analog-to-digital converter (ADC) 735 to produce digital samples of a waveform produced by a read head 730. The ADC 735 uses an output of the read clock phase interpolator 710 to sample the waveform. A digital read signal interface 740 is configured to receive the samples and input them into a processor for analysis. The drive system includes a write head 725 that is driven by a write clock signal outputted by the write clock phase interpolator 720. In some implementations, the write clock signal drives circuitry that controls the writing of data to a disk via the write head 725.

In some implementations, the write clock frequency is the same as the servo frequency. In some implementations, the frequency divider 715 is a 4:1 divider. By using a 4:1 frequency divider 715, the read clock frequency is four times that of the write clock frequency. The phase interpolators 710, 720, for the read and write clocks respectively, are used for the adjustment of the read and write clock phases. In some implementations, the read head 730 is integrated with the write head 725 into one head. In some implementations, the read head 730 is mounted with the write head 725 on a drive arm. In some implementations, the read head 730 is nonadjacent to the write head 725. In some implementations, the read head 730 is adjacent to the write head 725.

Figure 8:
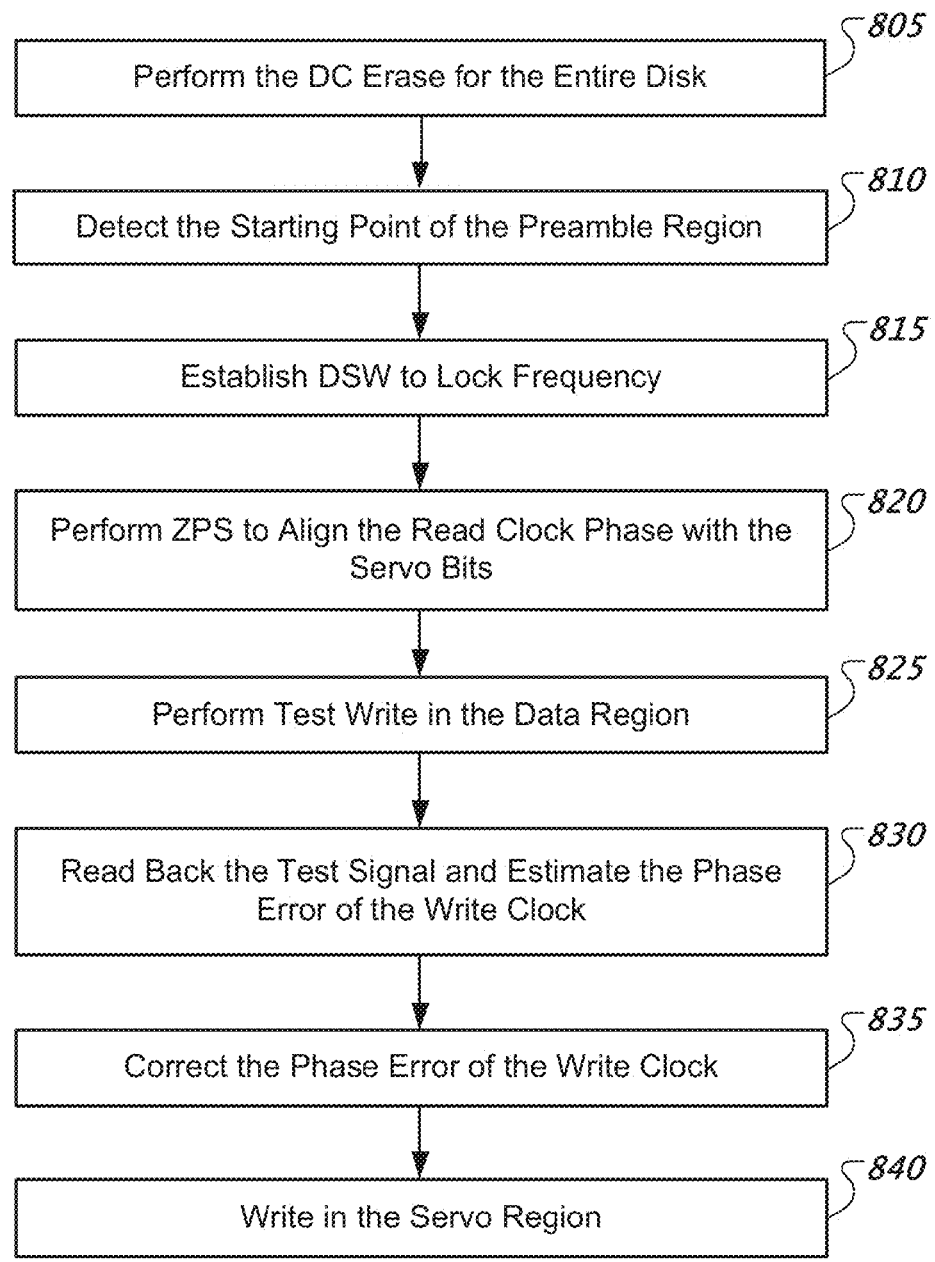
FIG. 8 shows an example of a self-servo write process based on DTM (Discrete Track Media).

FIG. 8 shows an example of a self-servo write process based on DTM. At 805, the process performs a DC erase for the entire disk. At 810, the process detects the starting point of the preamble region. At 815, the process establishes disk synchronous write (DSW) to lock frequency. Establishing DSW can include using a known number of servo clock counts between two consecutive servo wedges to lock a clock frequency. At 820, the process performs a Zero-Phase Start (ZPS) to align the read clock phase with the servo bits. A ZPS operation can include adjusting the phase of a read clock such that acquired sinusoidal samples associated with the preamble region(s) have a desired phase. At 825, the process performs a test write in the data region. At 830, the process reads back the test signal and estimates the phase error of the write clock. At 835, the process corrects the phase error of the write clock. At 840, the process writes in the servo region.

Details of SSW processes, including the one of FIG. 8, are described in the following paragraphs.

Performing a DC erase for the entire disk can include causing the magnetic material on a recording medium to be magnetized with the same polarity. In some implementations, performing a DC erase includes causing the write head to be positioned over each track for at least one full revolution of the medium and operating a write head to produce a uniform magnetic field. In some implementations, a recording medium can be magnetized with the same polarity with a bulk eraser before insertion onto a drive spindle.

A SSW process can include detecting the starting point of a servo region. A servo region can include a preamble region and a sync mark and track identifier region. The servo region includes non-magnetic portions such as grooves. A drive controller can detect one or more boundaries between a data region and a servo region when a read head is following a track. After a DC erase, the preamble region and the sync mark region exhibit a periodic pattern formed by polarized magnetic strips (e.g., lands) and non-magnetic grooves. The SSW process can use one or more filtering techniques to filter a read back signal produced by a head's passage over a track. After filtering, the read back signal over a DC-erased servo region, for example, is sinusoidal with a frequency equal to a servo frequency. In contrast, the read back signal from a DC-erased data region, for example, is a DC signal and becomes zero after filtering.

A drive controller can operate an ADC to produce digital samples of an analog signal, e.g., a waveform, produced by a read head. In some implementations, a waveform is sampled at a rate of four times of a servo frequency. The acquired signal samples can be represented by $x(n)$ for $n=0,1,\ldots,N-1$. Starting from $n=0$, the controller can compute sums based on: $[x(n)]^2 + [x(n+1)]^2$. The controller can compare the results with a predefined threshold $\gamma$. In some implementations, the starting point of the servo region, which can be a starting point of a preamble therein, is detected based on evaluating: $[x(n)]^2 + [x(n+1)]^2 \geq \gamma$. The threshold $\gamma$ can be determined by the amplitude of the sinusoidal signal to detect, noise power, and tolerance to a detection failure, which can be measured by the probabilities of false alarm and miss-detection. In some implementations, determining $\gamma$ is based on a criterion that the probability of false alarm should not exceed a pre-defined level, e.g., $P_{FA}$. In this case, the probability of false alarm refers to the probability that $[x(n)]^2 + [x(n+1)]^2 \gamma$ when $x(n)$ and $x(n+1)$ are not acquired from the sinusoidal part of the waveform. Let $\sigma$ be the standard deviation of the additive noise in the measurement. In the absence of the sinusoidal component, assuming that the additive noise is white Gaussian distributed, $$Z(n) = [x(n)]^2 + [x(n+)]^2$$

is a random variable distributed exponentially and $$\Pr\{Z(n) \geq \gamma\} = e^{-\frac{\gamma}{2\sigma^2}}.$$

The optimal threshold $\gamma$ can be determined by letting $$Pr\{Z(n) \geq \gamma\} = e^{-\frac{\gamma}{2\sigma^2}} = P_{FA},$$

which yields $\gamma = -2\sigma^2 \ln(P_{FA})$.

A SSW process can establish a DSW to lock one or more clock frequencies such as a read clock, write clock, or both. In some implementations, a drive controller can establish DSW to lock a clock frequency to a correct value. The SSW process can establish DSW using one or more techniques. For example, a technique can include using a known number of servo clock counts between two consecutive servo wedges. However, a technique can include estimating the number of servo clock counts if such a number is, for example, not known or not readily determinable.

If the number of servo clock counts between two consecutive servo wedges is known, then a clock frequency adjustment can be determined based on a measured number of servo clock counts and the expected number of servo clock counts. In this case, the detected start of a preamble region can be considered to be the start of a servo region. The SSW process can use a DSW control technique to determine one or more frequency offsets to adjust a frequency of a clock signal. That is, based on the difference between the measured clock counts and the desired clock counts, the clock frequency can be adjusted to be in synchronization with the rotating medium. Various examples of DSW control techniques and systems include those described by U.S. patent application Ser. No. 12/786,242, filed on May 24, 2010, and entitled "CLOCK FREQUENCY SYNCHRONIZATION FOR MAGNETIC RECORDING DEVICE."

If the number of servo clock counts between two consecutive servo wedges is unknown, a SSW process can use an acquired preamble signal, which is sinusoidal, to estimate the clock frequency. The drive controller can count the number of servo clock pulses between servo wedges. The controller can perform statistical techniques such as averaging to estimate the average number of servo clock pulses between two servo wedges. In some implementations, the controller can keep a counter that is reset during a transition from a non-alternating signal, which is indicative of a data track region, to an alternating signal which is indicative of a servo region. A DSW control technique can use the estimated number of servo clock counts to determine one or more frequency offsets.

A drive controller can perform a ZPS to align a read clock phase with servo bits on a medium. In some implementations, a read back signal from a preamble zone is a sinusoidal of a servo frequency. The phase of the sampled signal from a read head depends on the phase of the read clock. A ZPS operation can include adjusting the phase of a read clock such that the acquired sinusoidal samples have a desired phase. In some implementations, a drive controller operates a read clock phase interpolator to adjust a phase of a read clock.

Figure 9:
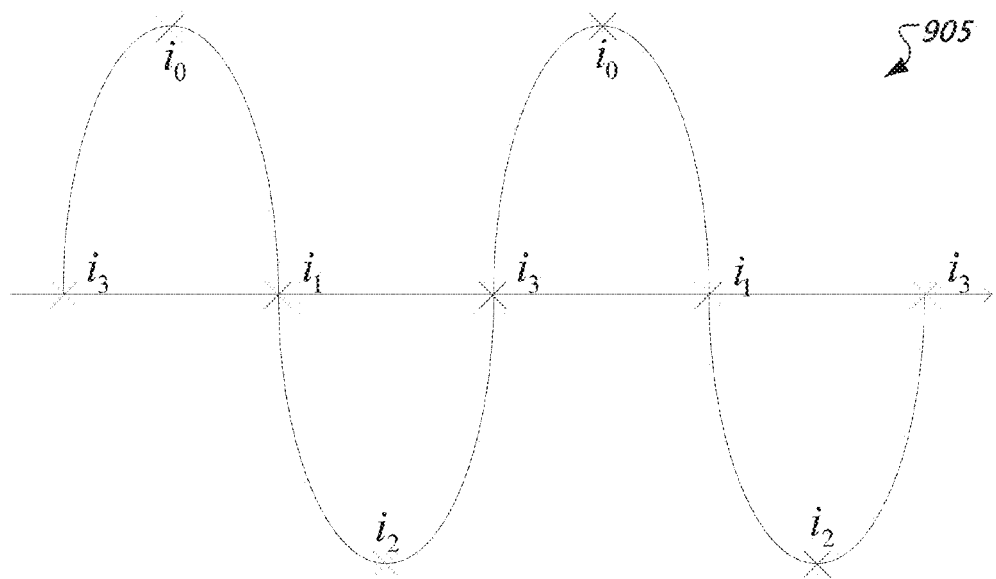
FIG. 9 shows an example of a graph of a waveform and samples thereof.

FIG. 9 shows an example of a graph of a waveform and samples thereof. A graph 905 shows a sinusoidal pattern. In this example, it is expected that performing a ZPS yields acquired samples that include maximum positive and negative amplitude extremes. The graph 905 includes a sequence of samples of read clock pulses. These samples are denoted by:

. . . , $i_0$, $i_1$, $i_2$, $i_3$, $i_0$, $i_1$, $i_2$, $i_3$, . . .

where $i_0$ corresponds to the maximum positive samples.

A drive controller can perform test writes and reads to estimate a phase error of a write clock. After a ZPS, a controller can perform one or more test writes in one or more data regions. After detecting the start of a preamble region, the controller performs a ZPS operation to align the read clock phase with the medium, e.g., aligning the read clock phase with one or more servo bits on the medium. After the ZPS is complete, the controller can wait for a predetermined amount of time and can start writing a test sequence with a known periodic pattern to one or more data track regions. For example, the pattern can be

. . . +−+−+− . . .

and can have a frequency that is one half of a servo frequency.

After the test sequence is written, the controller reads the track where the test sequence is written. In some implementations, before this read, the controller detects the start of a preamble region and performs the ZPS. Based on reading back the test sequence, the controller can determine the phase difference between the read and write operations. Samples of the read back signal can be represented by y(n) for n=0,1, . . . , N−1.

Figure 10:
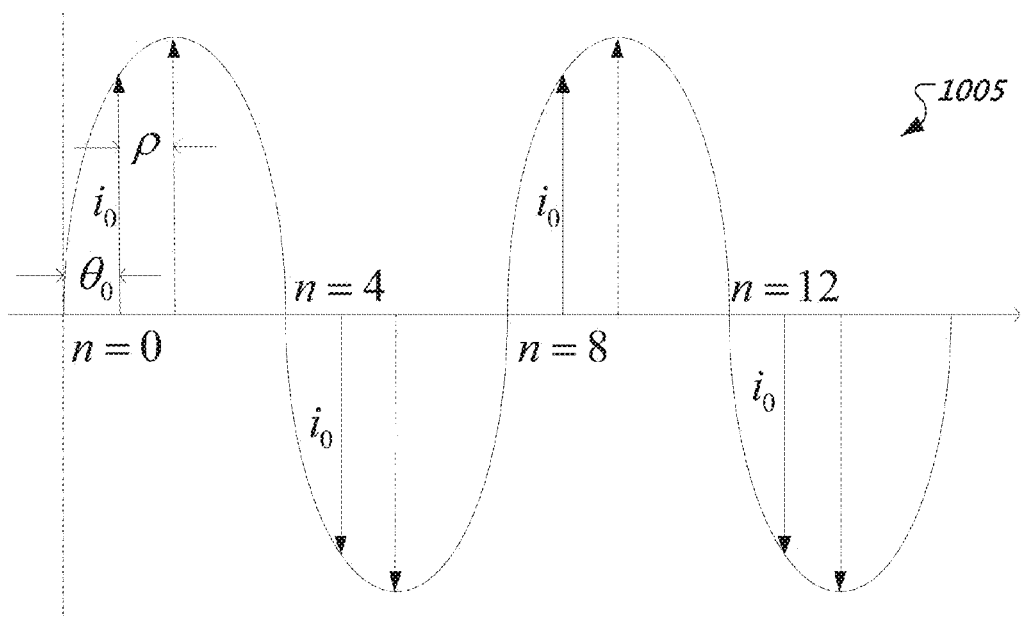
FIG. 10 shows another example of a graph of a waveform and samples thereof.

FIG. 10 shows another example of a graph of a waveform and samples thereof. In this figure, various example values of y(n) for different values of n are depicted by a graph 1005. The graph 1005 is marked with $\theta_0$ which represents a phase parameter and with ρ which represents a write clock phase error. The value for the write clock phase error ρ is based on the value for $\theta_0$ phase parameter. The read clock pulses after a ZPS cycle through a sequential order of values (e.g., $i_0$, $i_1$, $i_2$, $i_3$, $i_0$, $i_1$, $i_2$, $i_3$). Without loss of generality, assume that the initial sample, e.g., y(n) for n=0, is sampled by an instance of an $i_0$ read clock pulse. If there is no phase error in the write clock, it is expected that the acquired samples at the i instances correspond to the maximum positive and negative samples in an alternative turn (e.g., see positive and negative data points for different $i_0$ instances in the graph 1005).

The read back signal samples can be represented by $$y(n) = A_0 \sin\left(\frac{\pi}{4}n + \theta_0\right), n = 0, 1, \ldots, N-1$$

where $\theta_0$ represents a phase parameter and $A_0$ represents an amplitude parameter. In some implementations, the phase $\theta_0$ can be estimated by $$\hat{\theta}_0 = \tan^{-1}\left(\frac{\sum_{n=0}^{N-1} y(n)\cos\left(\frac{\pi}{4}n\right)}{\sum_{n=0}^{N-1} y(n)\sin\left(\frac{\pi}{4}n\right)}\right).$$

A write clock phase error can be based on this estimated phase. In some implementations, a write clock phase error ρ is estimated by $$\hat{\rho} = \begin{cases} \frac{1}{2} - \frac{\theta_0}{\pi}, & 0 \leq \theta_0 < \pi \\ \frac{3}{2} - \frac{\theta_0}{\pi}, & \pi \leq \theta_0 < 2\pi \end{cases}$$

and, here, $\hat{\rho}$ is normalized with respect to a servo clock period. The estimated write clock phase error $\hat{\rho}$ can be used to adjust a phase of the write clock.

A drive controller can estimate a write clock phase error. The controller can adjust the phase of the write clock according to the estimated write clock phase error. In some cases, if the estimated phase error is $\hat{\rho}$ a drive controller can advance the phase of the write clock by $-\hat{\rho}$. In some implementations, the controller can use a write clock phase interpolator to adjust the phase.

To write servo data, the drive controller can detect the start of the preamble region and perform ZPS for the read clock based on the detection. After ZPS is performed, the controller can start to write in a subsequent preamble region and the sync mark and track identifier region.

Figure 11:
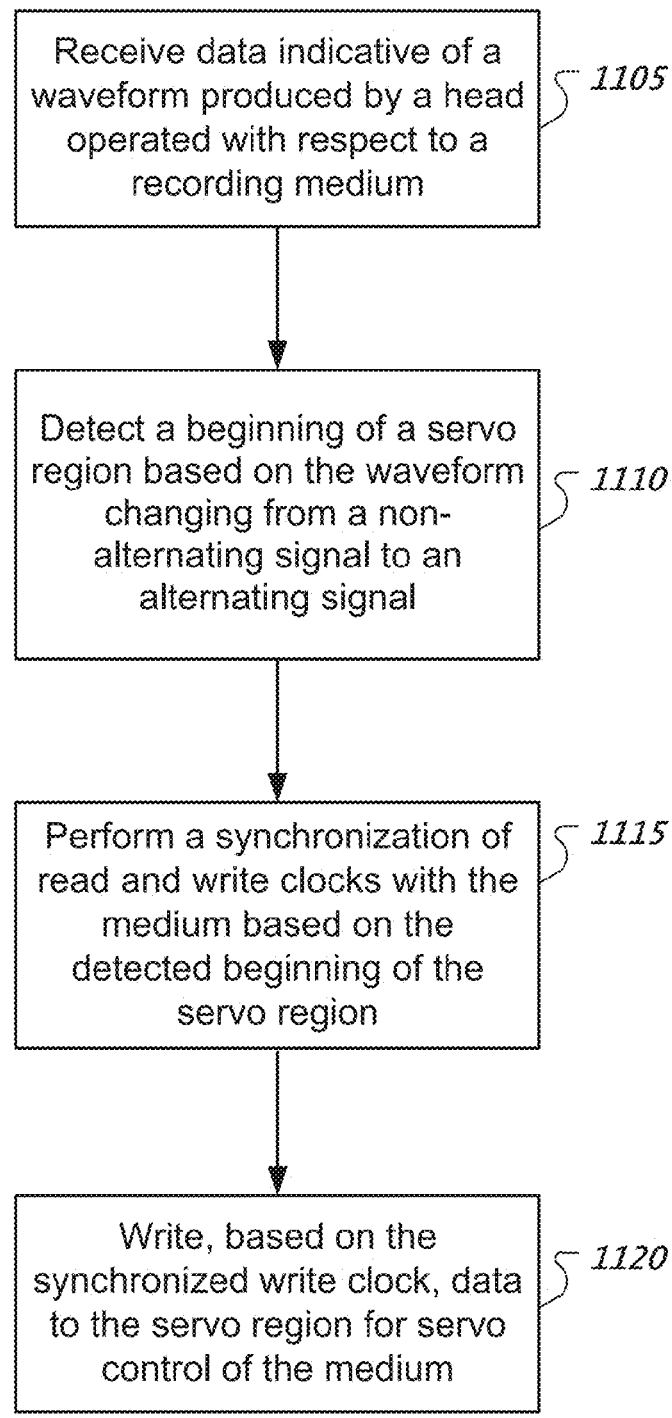
FIG. 11 shows an example of a self-servo write process.

FIG. 11 shows an example of a self-servo write process. At 1105, a SSW process receives data indicative of a waveform produced by a head operated with respect to a recording medium, such as a DTM disk. Receiving waveform data can include receiving samples produced by an analog-to-digital converter that is receiving an analog signal from a read head. At 1110, the SSW process detects a beginning of a servo region based on the waveform changing from a non-alternating signal to an alternating signal. Detecting a beginning of a servo region can include detecting a servo preamble. Based on an erasure of a DTM disk, the non-alternating signal is indicative of the head's path over a data region portion of a track, whereas the alternating signal is indicative of the head's path over discrete magnetic strips in the servo region. At 1115, the SSW process performs a synchronization of read and write clocks with the medium based on the detected beginning of the servo region. Performing a synchronization can include performing a read clock synchronization and performing a write clock synchronization. A phase of a write clock can be synchronized based on a phase of a read clock. Performing a synchronization can include adjusting a frequency and a phase of one or more clock signals. Performing a synchronization can include iteratively writing test sequences to the medium to refine a phase error. At 1120, the SSW process writes, based on the synchronized write clock, data to the servo region for servo control of the medium. Writing data can include using a write clock to write preamble and servo data to one or more servo regions.

Figure 12:
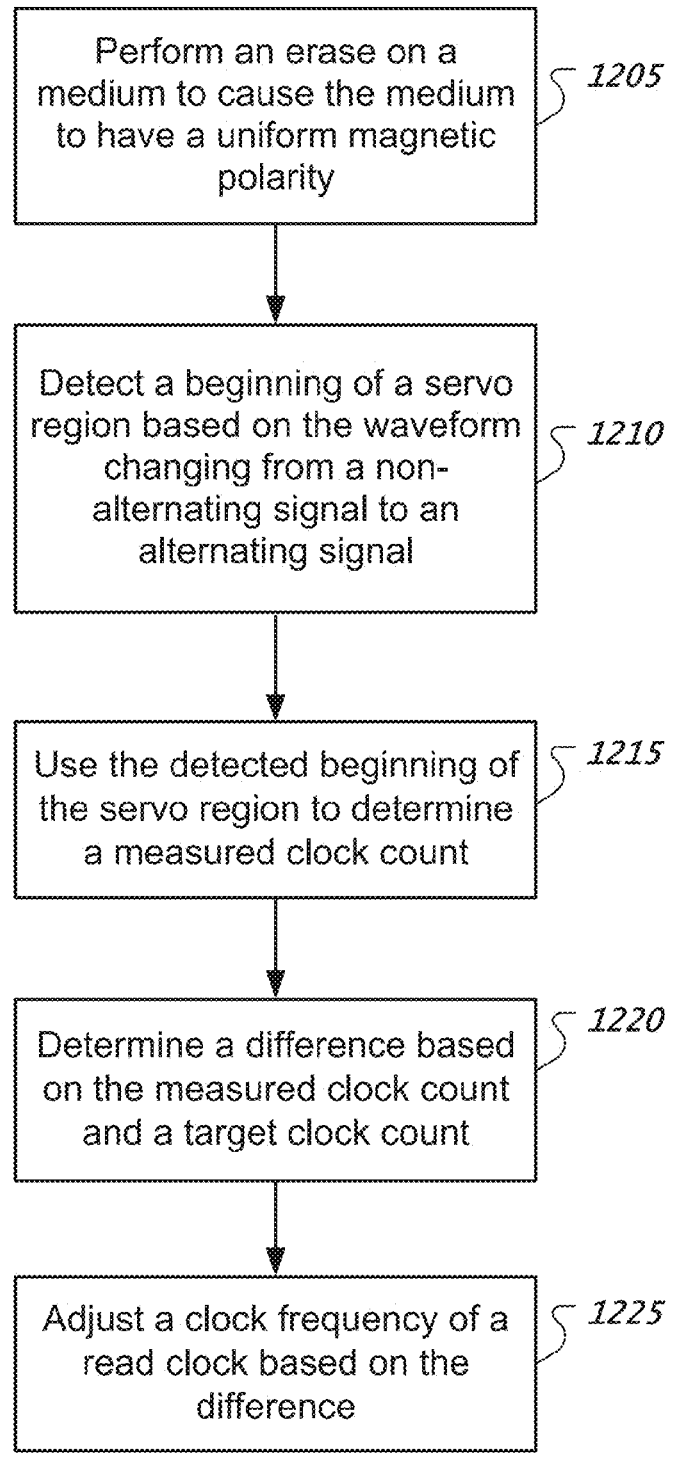
FIG. 12 shows an example of a read clock synchronization process implemented by a drive controller.

FIG. 12 shows an example of a read clock synchronization process implemented by a drive controller. A drive controller can synchronize a clock frequency such as a read clock via processing read head signals when a DTM based disk is in a state of uniform magnetic polarity. At 1205, a drive controller performs an erase on a medium to cause the medium to have a uniform magnetic polarity. At 1210, the drive controller detects a beginning of a servo region based on the waveform changing from a non-alternating signal to an alternating signal. In some implementations, the controller can obtain samples of a read-head waveform via an analog-to-digital convertor. At 1215, the drive controller uses the detected beginning of the servo region to determine a measured clock count. The controller can use a detected beginning of a servo preamble to determine a measured clock count between adjacent servo regions. In some implementations, the controller can count the number of clock pulses between starts of one or more servo regions. At 1220, the drive controller determines a difference based on the measured clock count and a target clock count. A target clock count can be based on an expected number of clock pulses between starts of one or more servo regions. At 1225, the drive controller adjusts a clock frequency of a read clock based on the difference. For example, if the measured clock count exceeds the target clock count, the clock frequency of the read clock can be decreased.

Figure 13:
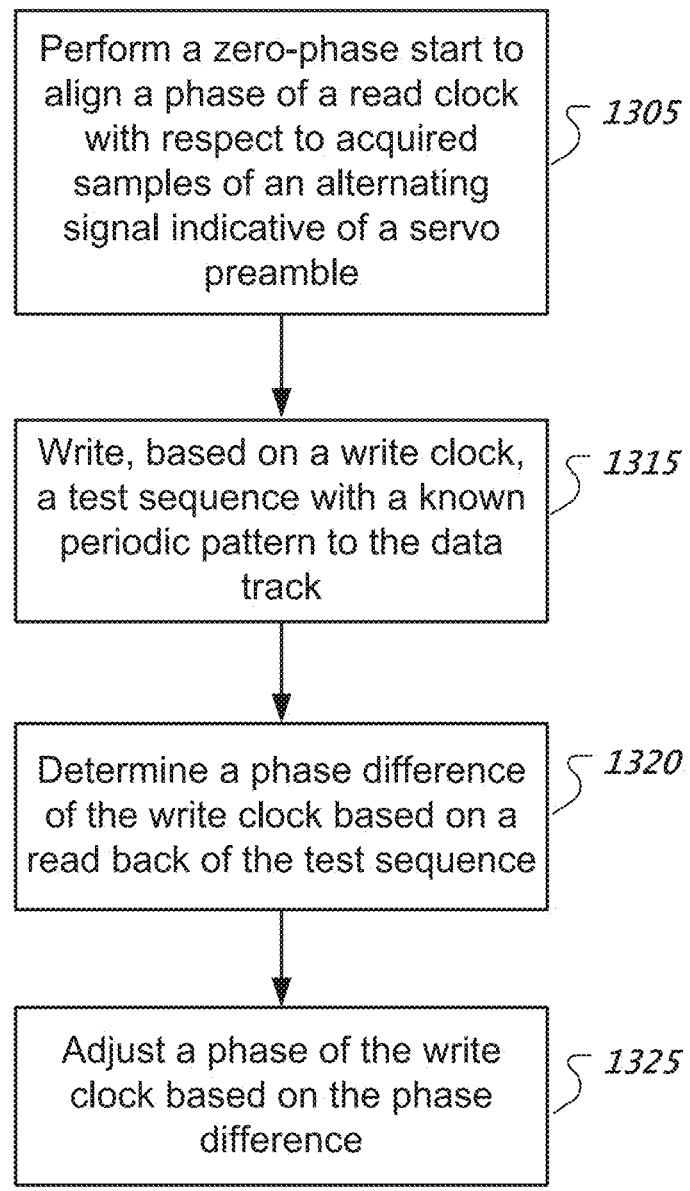
FIG. 13 shows an example of a write clock synchronization process implemented by a drive controller.

FIG. 13 shows an example of a write clock synchronization process implemented by a drive controller. A drive controller can synchronize a clock such as a write clock. At 1305, a drive controller performs a zero-phase start to align a phase of a read clock with respect to acquired samples of an alternating signal indicative of a servo preamble.

At 1315, the drive controller writes, based on a write clock, a test sequence with a known periodic pattern to the data track. In some implementations, writing data includes using a pulse of a write clock to write data to a DTM disk. At 1320, the drive controller determines a phase difference of the write clock based on a read back of the test sequence. A phase difference can be referred to as a phase error. At 1325, the drive controller adjusts a phase of the write clock based on the phase difference. If required, the controller can write one or more additional test sequences to the data track and can perform one or more refinements to the write clock.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A method comprising:
receiving data indicative of a waveform produced by a head operated with respect to a recording medium, wherein the medium comprises data tracks that are arranged based on circumferences of the medium and servo regions, each of the servo regions comprising multiple discrete strips of magnetic material that are radially arranged with respect to the medium;
detecting a servo region of the servo regions based on the waveform becoming an alternating signal, the alternating signal being indicative of the head's path over the discrete magnetic strips in the servo region;
performing a frequency synchronization of a read clock based on the detection of the servo region to establish a frequency lock;
performing a phase synchronization of the read clock to align a phase of the read clock with respect to acquired samples of the alternating signal;
performing a synchronization of a write clock based on a write of a test sequence to the medium, the write clock being responsive to the frequency lock and the read clock; and
writing, using the synchronized write clock, data to the medium for servo control.

2. The method of claim 1, wherein the detecting is performed when the medium is in a state of uniform magnetic polarity, and wherein the detecting comprises detecting a beginning of the servo region based on the waveform changing from a non-alternating signal to the alternating signal, the non-alternating signal being indicative of the head's path over a data track of the data tracks.

3. The method of claim 2, further comprising:
performing an erase on the medium to put the medium in the state of uniform magnetic polarity.

4. The method of claim 1, wherein the servo region is a first servo region, wherein the method further comprises:
detecting a second servo region of the servo regions;
determining a measured clock count based on the detection of the first servo region and a detection of the second servo region;
determining a difference based on the measured clock count and a target clock count; and
adjusting a clock frequency of the read clock based on the difference.

5. The method of claim 1, wherein performing the phase synchronization of the read clock comprises performing a zero-phase start to align the phase of the read clock with respect to the acquired samples of the alternating signal.

6. The method of claim 1, wherein performing the synchronization of the write clock comprises:
writing, based on the write clock, the test sequence with a known periodic pattern to a data track of the data tracks;
determining a phase difference of the write clock based on a read back of the test sequence; and
adjusting a phase of the write clock based on the phase difference.

7. An apparatus comprising:
circuitry configured to receive data indicative of a waveform produced by a head operated with respect to a recording medium, wherein the medium comprises data tracks that are arranged based on circumferences of the medium and servo regions, each of the servo regions comprising multiple discrete strips of magnetic material that are radially arranged with respect to the medium;
circuitry configured to detect a servo region of the servo regions based on the waveform becoming an alternating signal, the alternating signal being indicative of the head's path over the discrete magnetic strips in the servo region;
circuitry configured to perform a frequency synchronization of a read clock based on a detection of the servo region to establish a frequency lock;
circuitry configured to perform a phase synchronization of the read clock to align a phase of the read clock with respect to acquired samples of the alternating signal;
circuitry configured to perform a synchronization of a write clock based on a write of a test sequence to the medium, the write clock being responsive to the frequency lock and the read clock; and
circuitry configured to cause a write, based on the write clock, of data to the medium for servo control.

8. The apparatus of claim 7, wherein the circuitry configured to detect the servo region comprises circuitry configured to detect, based on the medium being in a state of uniform magnetic polarity, a beginning of the servo region based on the waveform changing from a non-alternating signal to the alternating signal, the non-alternating signal being indicative of the head's path over a data track of the data tracks.

9. The apparatus of claim 8, comprising:
circuitry configured to perform an erase on the medium to put the medium in the state of uniform magnetic polarity.

10. The apparatus of claim 7, wherein the servo region is a first servo region, wherein the apparatus further comprises:
circuitry configured to detect a second servo region of the servo regions;
circuitry configured to determine a measured clock count based on the detection of the first servo region and a detection of the second servo region;
circuitry configured to determine a difference based on the measured clock count and a target clock count; and
circuitry configured to adjust a clock frequency of the read clock based on the difference.

11. The apparatus of claim 7, further comprises:
circuitry configured to perform a zero-phase start to align the phase of the read clock with respect to the acquired samples of the alternating signal.

12. The apparatus of claim 7, further comprises:
circuitry configured to write, based on the write clock, the test sequence with a known periodic pattern to a data track of the data tracks;
circuitry configured to determine a phase difference of the write clock based on a read back of the test sequence; and
circuitry configured to adjust a phase of the write clock based on the phase difference.

13. A system comprising:
a read clock;
a write clock;
a recording medium, wherein the medium comprises data tracks that are arranged based on circumferences of the medium and servo regions, each of the servo regions comprising multiple discrete strips of magnetic material that are radially arranged with respect to the medium;
a head to produce a waveform based on the head's passage over the medium; and
a controller configured to
receive data indicative of the waveform,
detect a servo region of the servo regions based on the waveform becoming an alternating signal, the alternating signal being indicative of the head's path over the discrete magnetic strips in the servo region, perform a frequency synchronization of a read clock based on a detection of the servo region to establish a frequency lock, perform a phase synchronization of the read clock to align a phase of the read clock with respect to acquired samples of the alternating signal, perform a synchronization of a write clock based on a write of a test sequence to the medium, the write clock being responsive to the frequency lock and the read clock, and cause a write, based on the write clock, of data to the medium for servo control.

14. The system of claim 13, wherein the controller is configured to detect, based on the medium being in a state of uniform magnetic polarity, a beginning of the servo region based on the waveform changing from a non-alternating signal to the alternating signal, the non-alternating signal being indicative of the head's path over a data track of the data tracks.

15. The system of claim 14, further comprising:
an eraser configured to perform an erase on the medium to put the medium in the state of uniform magnetic polarity.

16. The system of claim 13, wherein the servo region is a first servo region, wherein the controller is configured to
detect a second servo region of the servo regions,
determine a measured clock count based on the detection of the first servo region and a detection of the second servo region,
determine a difference based on the measured clock count and a target clock count, and
adjust a clock frequency of the read clock based on the difference.

17. The system of claim 13, wherein the controller is configured to perform a zero-phase start to align the phase of the read clock with respect to the acquired samples of the alternating signal.

18. The system of claim 13, wherein the controller is configured to
write, based on the write clock, the test sequence with a known periodic pattern to a data track of the data tracks,
determine a phase difference of the write clock based on a read back of the test sequence, and
adjust a phase of the write clock based on the phase difference.

19. The system of claim 13, wherein the read clock includes a first phase interpolator, wherein the write clock includes a second phase interpolator, and wherein the read clock is configured to drive the write clock by providing an output of the first phase interpolator as an input to the second phase interpolator.

20. The system of claim 19, further comprising:
a frequency divider that is coupled between the first phase interpolator and the second phase interpolator, and configured to modify a frequency of the output of the first phase interpolator.

* * * * *